Aug. 3, 1971     E. PLUMAT     3,597,176
METHOD AND APPARATUS FOR MANUFACTURING BEADS
Filed March 7, 1968     2 Sheets-Sheet 1
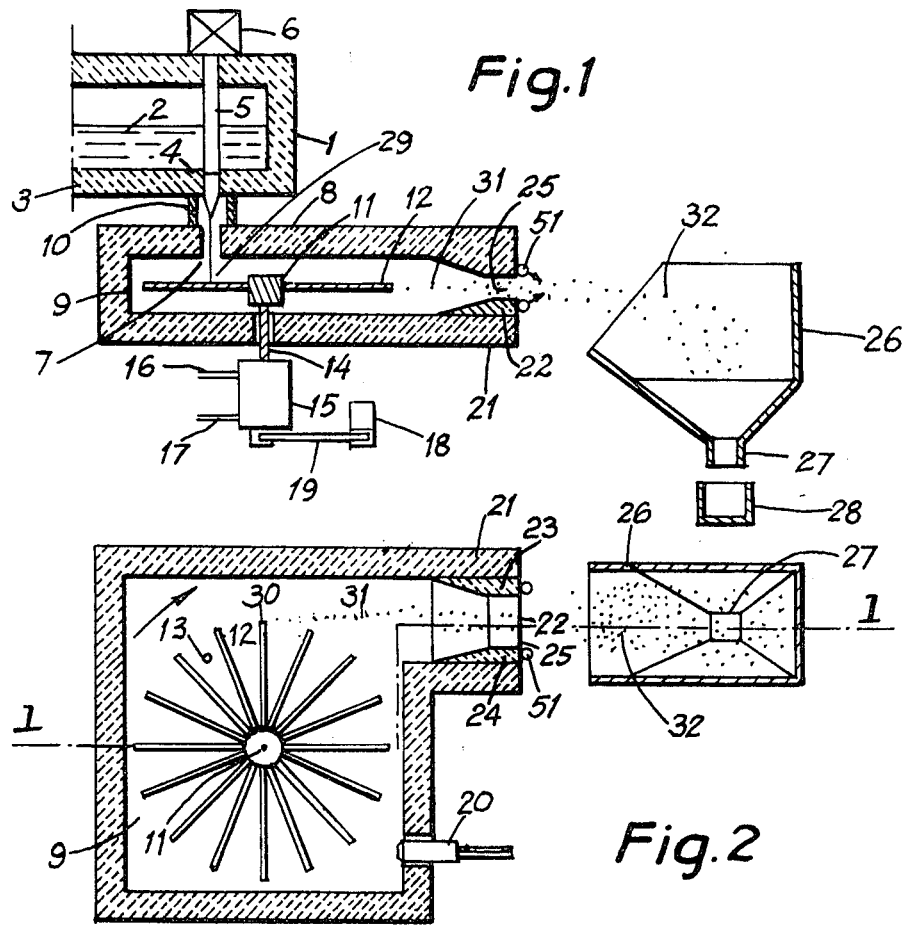
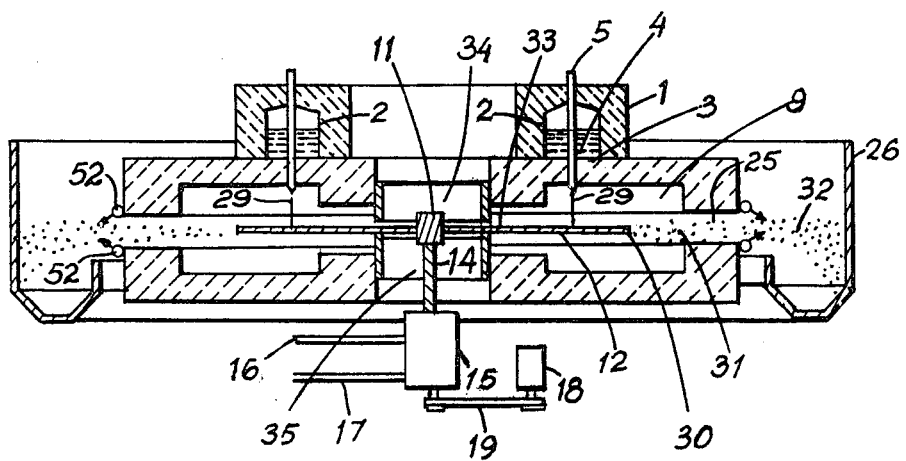
INVENTOR
EMILE PLUMAT
BY
*Toulmin & Toulmin*
ATTORNEYS INVENTOR
EMILE PLUMAT
BY
Toulmin & Toulmin
ATTORNEYS United States Patent Office 3,597,176
Patented Aug. 3, 1971

3,597,176
METHOD AND APPARATUS FOR MANUFACTURING BEADS
Emile Plumat, Gilly, Belgium, assignor to Glaverbel S.A., Watermael-Boitsfort, Belgium
Continuation-in-part of abandoned application Ser. No. 443,419, Mar. 29, 1965. This application Mar. 7, 1968, Ser. No. 716,688
Claims priority, application Luxembourg, Apr. 21, 1964, 45,925
The portion of the term of the patent subsequent to Mar. 10, 1987, has been disclaimed
Int. Cl. C03b 19/10
U.S. Cl. 65—21
21 Claims

ABSTRACT OF THE DISCLOSURE

A method and apparatus for producing grains by cutting a thread of molten material with the projecting arms of a rotating member, permitting the molten material segments to spread out and flow outwardly along the arms and to be expelled from the ends of the arms under the influence of centrifugal forces so as to be dispersed into particles, maintaining the material at a temperature above its melting point as it moves along the arms and eventually substantially above its melting point as it travels through space after being expelled therefrom for permitting the particles to spherulize, cooling the particles to solidify them, and collecting the resulting solidified grains.

CROSS-REFERENCE TO RELATED APPLICATIONS

This is a continuation-in-part of my copending U.S. application Ser. No. 443,419, filed on Mar. 29, 1965, and now abandoned.

BACKGROUND OF THE INVENTION

The present invention relates to a method and apparatus for manufacturing grains particularly small glass beads, the dimension of which is usually only a fraction of one millimeter. Such glass beads of extremely small size are being used, for example, for movie screens or reflecting paint.

Several processes are known for manufacturing small glass beads consisting first in crushing raw glass into grains which are assorted according to size by sieving them, secondly in melting said grains in suspension in hot gases in which they spherulize, and thirdly in cooling them down. As this manufacturing process entails multiple operations, the manufacturing costs are rather high. These operations are the following: double melting with a high fuel consumption, fine crushing of the raw material and sieving of the grains. All this is expensive. The energy consumption is high and high-priced equipment has to be acquired and maintained. Besides, the particles, softened at a high temperature, show a tendency to adhere to each other or to the walls of the apparatus and this phenomenon limits the efficiency of the equipment, the production capacity and the quality of the product.

The glass grains can also be mixed with a nonadhering powder and melted in a heated rotating cylinder, but the manufacturing costs of the small glass beads obtained by using such a process are also high because expensive powders have to be employed, otherwise, the small glass beads produced are blackened by inclusions.

Moreover, it has been suggested to cut the costs arising from crushing the raw glass into grains, sieving the latter and remelting them by trying to directly split up a mass of molten glass into fine particles. This splitting up can be done by making use of ultrasonic vibrations, but the equipment to be used for this purpose is rather complicated and, besides, the electric power consumption is very high. It is difficult indeed to split up a thread of molten glass either by directing hot gas jets perpendicularly to said thread or by the action of a burner which is placed in a vertical position. The fuel consumption required for this purpose is very high as well as the amount of energy to be consumed for compressing the gases for the same purpose. When a thread of glass, put in motion by means of jets of compressed gases and falling upon a surface nearly horizontally splits up, the diameters of the glass particles are large and unequal.

The present invention eliminates these inconveniences and, moreover, offers some advantage which will be brought to light in the following text.

According to the invention, the threads of molten material, whatever their number may be, are met and split up by the successive arms of a piece, rotating at a high tip speed, said material being expelled from said arms under the action of the centrifugal force. The material is split up into particles in two stages: in the first stage, the thread of material is split up into distinct elements which can be separately displaced along the arms of the rotating piece. These elements spread out upon and wet the arms whereas they are subjected to the centrifugal force which moves them radially away from the center. In the second stage, the material which has reached the end of the corresponding arm, is expelled from the arm by the centrifugal force and split up again into particles which move at a very high speed in the hot gases of an enclosed space so that the superficial tension to which they are subjected shapes them into spheres if the viscosity is of about 100 poises maximum. Said particles after making their own trajectories reach a cold space in which they soldify and are collected.

SUMMARY OF THE INVENTION

It is a primary object of the present invention to eliminate heretofore explained drawbacks and difficulties.

Another object of the present invention is to substantially improve the division of molten glass into relatively small, substantially spherical beads.

Yet another object of the present invention is to accurately regulate the size of the grains being produced.

Still another object of the present invention is to substantially increase the rate of production of such grains.

A further object of the invention is to simplify the production of such grains.

Another object of the invention is to impart a spherical shape to beads in a simple manner.

As will be explained in more detail below, while the present invention is particularly concerned with the teatment of glass, many of the novel features of the invention lend themselves particularly well to the treatment of other relatively viscous materials and the apparatus according to the invention could, in fact, satisfactorily operate on many materials of the type which is solid at definite temperatures and which becomes molten at more elevated temperatures.

The above and other objects according to the invention are achieved by the provision of an apparatus for manufacturing grains of a material of the type which is solid at definite temperatures and which is molten at more elevated temperatures. The apparatus essentially includes feeding means for dispensing a thread of such material in its molten state, and rotatable means including a plurality of projecting arms arranged for rotation about an axis and positioned for meeting the thread of molten material from the feeding means. The apparatus further includes a laterally open chamber surrounding at least a part of the rotatable means, driving means operatively connected to the rotatable means for rotating the arms so as to impart high tip speed thereto for causing the molten material to be expelled in the form of small particles from the tips of the arms by centrifugal force, and heating means associated with the chamber for producing a temperature therein, at least in the region of the rotatable means, sufficient to maintain the material in a molten state as they traverse such region.

The objects according to the present invention are further achieved by a method of manufacturing grains of a material which is solid at definite temperatures and molten at more elevated temperatures by forming a thread of such a material in its molten state, disposing a rotatable piece having projecting arms in the path of the thread so that the thread is spaced inwardly from the ends of the arms, maintaining the space containing the rotatable piece at temperatures above the melting point of the material, and rotating the piece for causing the arms to intersect the thread thereby dividing the thread into segments each of which spreads out upon its associated arm, flows outwardly to the end of its arm under the action of centrifugal forces, and is expelled from the end of its arm at high speed so as to be dispersed into particles in the space surrounding the rotatable piece.

Thus, according to the method of the invention, the falling thread, or threads, of molten material is met by a plurality of rotating arms which divide the thread so that each arm becomes loaded with at least a small mass of the molten material. Each such mass is conveyed toward the outer end of its associated arm under the influence of the centrifugal force produced by the rotation of the rotatable piece. Thus, in a first operation, the thread of molten material is broken up into segments by the rotating arms and, in a second operation, expelled from the ends of the arms, which are rotating at a high speed, so that each segment is divided into several small particles. Because the arms are distributed around the entire circumference of the rotatable piece and all act to produce particles of the molten material, and also because the free ends of the arms are driven at a high velocity, a high production capacity can be achieved even when a rotatable piece having a relatively small diameter is employed.

Another advantage of the novel structure according to the invention is that an intermittent contact is produced between the falling thread and the rotatable piece, which intermittent contact facilitates the splitting up of the thread and the dispersion of the molten material from each arm. As a result of this highly efficient dispersion of the molten material, the rate of production of the particles can be substantially increased.

It has been found that the use of a rotating piece provided with projecting arms in place of a rotating piece whose circumference is continuous permits a greater control to be effectuated on the trajectories of the particles expelled from the piece in that the resulting trajectories deviate less from a direction which is a tangent to the periphery of the piece and are more stable.

The present invention is particularly concerned with producing large quantities of particles having a high degree of sphericity in a relatively simple and efficient manner. The invention also seeks to accurately regulate the size of the resulting particles. Applicant has found that a prime requisite for the attainment of these objectives is that a proper control be effectuated on the viscosity of the molten material during the stage when it is in contact with the projecting arms of the rotatable piece and during the stage when the resulting particles traverse the relatively hotter space surrounding the rotatable piece, in which space the particles assume spherical shape under the influence of surface tension.

The viscosity at which the material is maintained while traversing the hotter space is particularly important when the molten material being treated is glass primarily because the molten glass particles can assume a spherical shape under the influence of surface tension only if their viscosity is maintained at a low value and because the viscosity of molten glass can be relatively large and varies considerably with variations in its temperature.

It is primarily for these reasons that the concept of maintaining a hotter region adjacent the rotatable piece offers the greatest benefits when glass is the material being treated.

Moreover, because the glass is being positively maintained in a low viscosity state while undergoing the sphering process, it is no longer necessary to initially heat the glass to an extremely high temperature before delivering it to the rotatable piece. If such were not the case, it would be necessary to initially heat the glass to such a high temperature that the usual refractory materials cannot stand up and the glass heating operation becomes unacceptably expensive.

It has been found that, in order for the molten material particles to assume a spherical shape under the influence of surface tension while traversing the hotter space, the particles must be maintained at a temperature which is sufficiently high to maintain them at, or bring them to, a viscosity of no more than 100 poises for a normal period of travel through the hotter space. The molten particles could assume a spherical shape under the influence of surface tension even if their viscosity were as high as 200 poises, but this would require that the time of travel of the particles through the hotter space be substantially increased with respect to the travel times normally available.

Furthermore, when the viscosity is too high for achieving a good formation of spheres according to the indications which have just been given, the process and the apparatus according to the invention make it possible to produce grains having a non-spherical shape and showing compact forms with the exclusion of any fiber, if the viscosity of the material treated reaches a maximum value of about 350 poises; if the material treated has a too high viscosity beyond its melting point, the formation of fibers can nevertheless be avoided and it is possible to produce either non-spherical grains by maintaining the space into which the particles are expelled at temperatures for which the viscosity does not exceed about 350 poises, or to obtain beads of spherical shape if the viscosity is lowered to 200 or preferably about 100 poises.

Thus, it will be appreciated that while the viscosity of glass or other material is determined by its temperature, each variety of glass or each material has a different temperature-viscosity characteristic and, as a general rule, it is the viscosity of material which will determine its ability to sphere under the influence of surface tension. Therefore, it is more accurate to describe the state in which the particles must be placed in terms of their viscosity rather than in terms of their temperature.

However, in order to provide a better understanding of the present invention, several specific examples of types of glass which can be treated according to the invention and of the temperatures at which they must be maintained during treatment will be given below.

Ordinary window glass can only be treated at temperatures of the order of 1500° C. This has been found to be particularly difficult because the refractory materials do not hold up well at these temperatures.

Glass having a compositon of 40% $SiO_2$, 15% $Al_2O_3$, 30% CaO and 15% MgO has a viscosity of 22 poises at 1300° C. and 59 poises at 1250° C.

Glass having a composition of 50% $SiO_2$, 10% $Al_2O_3$, 30% CaO and 10% MgO has a viscosity of 39 poises at 1300° C. and 75 poises at 1250° C.

Thus, these types of glass can be treated at any temperature greater than or equal to 1250° C. in such a way as to avoid all danger of their devitrification.

While the provision of a hotter zone around the rotatable piece provides the greatest benefits when glass is being treated, the same benefits accrue, to a lesser degree, when some other viscous material whose viscosity variation is less dependent on temperature is being treated.

In addition, the apparatus according to the invention could be used for the treatment of other materials which are not of the viscous type in that their viscosity is not high and remains substantially constant over the entire range of liquid phase temperatures. Such materials and some others can be successfully treated in apparatus provided with a hotter zone obtained simply by providing an insulating enclosure and by heating the materials to a sufficiently high temperature to assure that, if beads must be produced, the resulting particles do not even partially solidify in contact with the rotatable piece and remain in a sufficiently low viscosity state during a portion of their free travel to a collecting zone. However it has been found that even in these cases certain benefits can be obtained with heating means for supplying heat other than that initially delivered to the molten thread. This permits the material to be initially heated to a lower temperature above its melting point inasmuch as the material will be maintained in a molten state or in a sufficiently low viscosity state by the heated zone. Since, in the absence of such an especially heated zone, the material would otherwise have to be heated to a temperature substantially above its melting point or above its low viscosity temperature, particularly because the material dissipates heat at an extremely high rate after having broken up into particles, it might be necessary to initially heat the material to such a high temperature that it would be in danger of decomposing or of being otherwise undesirable affected.

Furthermore, the apparatus of the present invention provides a more efficient use of heat.

Insofar as concerns the conditions existing in the region occupied by the portions of the rotatable piece with which the molten material comes in contact, this region can be maintained at temperatures other than the temperature of the space where the particles are expelled but must be maintained at least at the melting temperature. The temperature at which the material is maintained while in contact with the rotatable piece must also be sufficiently high to enable the material to spread out in the form of a sufficiently thin film. One effect of increasing the temperature of the material during the time when it is in contact with the rotatable piece is that the size of the resulting particles will be reduced as a result of the lowering of the viscosity of the material at the time of its spreading out in contact with the piece and of its expulsion from the piece. Thus, a different temperature in the region occupied by the rotatable piece permits greater flexibility in controlling the size of the resulting particles.

As a general rule, the size of the resulting particles will decrease as the rate of rotation and/or diameter of the rotatable piece is increased and as the surface tension, viscosity and/or flow rate of the material to be treated is reduced.

Among viscous materials which could be treated according to the invention, it is possible to cite thermoplastic materials such as: polystyrene having a molecular weight of 50,000 to 100,000 and a viscosity of 100 poises at a suitable treatment temperature of 217° C. and polyethylene having a molecular weight of less than 80,000 and a viscosity of less than 100 poises at a suitable treatment temperature of 140° C.

The apparatus according to the invention could also be used for treating the following nonthermoplastic materials:

ammonium polyphosphates, which could be treated according to one of the two following nonlimitative examples:

|  | Example I | Example II |
|---|---|---|
| Hot chamber: |  |  |
| Diameter, mm | 500 | 500 |
| Temperature, ° C | 170 | 170 |
| Rotable piece: |  |  |
| Diameter, mm | 200 | 400 |
| Velocity, r.p.m | 200 | 1,200 |
| Beads: |  |  |
| Average diameter, mm | 3 | [1] 700 |
| Production rate, kg./hour | 300 | 300 |

[1] Microns.

ammonium nitrate having a melting temperature of between 160 and 260° C.; and calcium metaphosphate having a specific gravity of 2.82 at a melting temperature of 975° C.

Several other specific examples are presented in the table below:

TABLE

| Nature of material | Properties of the material | | | | | | Centrifugation conditions | | | |
|---|---|---|---|---|---|---|---|---|---|---|
| | Material flow rate, kg./hours | Surface tension | | Viscosity | | Specific gravity | Disc diameter, mm. | Disc velocity, r.p.m. | Average diameter of beads | Hot zone temperature, ° C. |
| | | Dynes/cm. | ° C. | Poises | ° C. | | | | | |
| Na₃PO₄ | 50 / 550 / 2,000 | 100 | | 10 | 100 | 1.62 | 250 / 250 / 600 | 1,500 / 3,500 / 3,500 | 300 / 160 / 500 | 95 |
| Sulfur | 550 | 40 | 445 | 7.03 | 150 | ([1]) | 250 | 3,500 | 100 | 150 |
| NaCl | 550 | 114 | 803 | 1.01 | 841 | 2.165 | 250 | 3,500 | 65 | 850 |
| NaNO₃ | 550 | 120 | 322 | 2.5 | 320 | 2.26 | 250 | 3,500 | 110 | 400 |
| Glass (1)[2] | 550 | 350 | | 59 | 1,250 | | 250 | 3,500 | 220 | 1,250 |
| Glass (2)[2] | 550 | 350 | | 75 | 1,250 | | 250 | 3,500 | 230 | 1,250 |

[1] Solid=2.07; Liquid=1.8.
[2] See the following table:

| Glass composition (percent) | SiO₂ | Al₂O₃ | CaO | MgO |
|---|---|---|---|---|
| (1) | 40 | 15 | 30 | 15 |
| (2) | 50 | 10 | 30 | 10 |

In the present invention the glass needs to be melted only once. Further melting in a tank is much less expensive than the melting of grains in suspension in a large volume of hot gas. The cost of crushing the raw glass into grains of an adequate size, of sieving them, of handling the glass and remelting it, is eliminated. The electric power consumption is considerably reduced. The diameter of the small glass beads produced and their quantity can be determined by adjusting the flow of the molten glass and the tip speed of the rotating piece. The dispersion of the glass is facilitated to a great extent by the intermittent contact of the glass thread with the rotating piece, said contact splitting up the glass with the result that the optimum temperature for treating the glass can be limited or the production of small glass beads can be increased. The amount of calories necessary for this purpose can be very small, because the glass is advantageously dispersed at the high temperatures used for melting it without intermediate cooling, thus without having to create an amount of calories other than the one to be made available for compensating the heat losses through the walls. It has also been found that the trajectories of the particles deviate less from the direction of the tangent and are more stable when they leave a rotating piece which is provided with radial arms, than when they leave a rotating piece, the edge of which is a continuous circumference, i.e., that the angular dispersion of the trajectories is smaller. This results in the particles being in better stability condition, when they leave said rotating piece. In fact, it has been found that the diameters of the small glass beads formed vary within narrow bounds, and it is a quality of said small glass beads that these bounds are narrow. It also results in a smaller dispersion of the trajectories, so that if it is not desired to build a chamber extending over an angle of 360° around the axis of rotation, a more compact apparatus can be made.

It is also intended to create a device for manufacturing small glass beads according to the process described above. This device is made up of a tank containing molten glass provided with means for forming at least one thread of molten glass, a rotating piece positioned in such a manner that it meets said threads whatever their number may be, means for rotating said piece and an enclosed space in which the temperature can be raised to a high degree, said space surrounding at least a part of said rotating piece as well as a part of the adjacent space. According to the invention, said rotating piece is provided with radial arms so placed that they meet the threads of molten glass, whatever their number may be.

The radial arms of the rotating piece are advantageously made of wires, said wires being made of a heat-resisting metal as, for example, of a heat-resisting steel, nickel, molybdenum, tungsten, with coatings protecting them against corrosion. In fact, it has been observed that the rotating spindle which requires cooling is more easily cooled because the heat losses through conduction from the hot zone, located at the end of said wires to the cooled point of the spindle, are limited by the section of the wires. Besides, wires can easily resist mechanical and thermal stresses. They can not easily strain or warp and the centrifugal force to which they are subjected keeps them straight. Due to the fact that such wires can be set up with a small quantity of material, the price of the rotating piece is reduced accordingly and the internal stresses caused by the centrifugal force to which the rotating piece is subjected are also reduced. This advantage is not negligible because the diameter of the rotating piece can be increased with the result that the production of small glass beads can be increased also. The heat-resisting steel grades are suitable for this purpose because they satisfactorily resist the different agents and because they can be obtained economically.

According to another embodiment of the invention, the radial arms of the rotating piece are shaped as blades. In fact, it has been found that the molten glass spreads out on the surface of blades over a wider area so that the quantity of the molten glass used for manufacturing the small glass beads can be considerably increased without increasing the diameter of the small glass beads manufactured in this way. The blades can be made of the same metals as those used for the wires.

In a preferred embodiment of the invention, the enclosed space in which the small glass beads are made, is an annular chamber containing at least a terminal part of the radial arms as well as the adjacent space, located on both sides of the middle plane which is swept by the radial arms, and so the spindle driving the rotating piece is placed outside the annular chamber in the central region which it encircles. Consequently, the spindle is entirely protected against the heat of the gases contained in the enclosed space in which the small glass beads are made. Consequently, the spindle is subjected to reduced internal stresses and need not be so intensively cooled. The construction is thus simplified as far as the spindle itself is concerned, as well as the way of assembling the arms on the hub and/or the hub on the spindle.

According to the invention, the rotating piece has hollowings in a region in the shape of a corona passing through a circular slot made for this purpose in the inside wall of the annular space. These hollowings are used because they restrict the heat transmission between the overheated arms and the cooled spindle, said heat transmission being essentially made possible by the conduction in the rotating piece when an annular chamber is used.

These indentations can be more particularly made by means of the intervals between the radial arms and/or perforations intentionally made in the region of the arms and the hub which can be seen in the inside slot of the annular chamber.

BRIEF DESCRIPTION OF THE DRAWINGS

FIG. 1 is a vertical section made along the line 1—1 of the device shown in FIG. 2.

FIG. 2 is a plan view showing the same device.

FIG. 3 is a vertical section referring to another embodiment of the invention.

DESCRIPTION OF THE PREFERRED EMBODIMENTS

Figure 4:
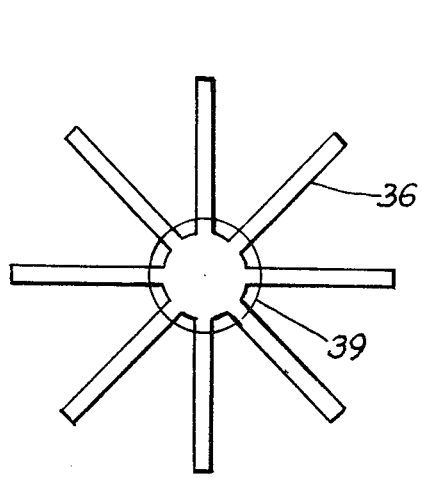
FIGS. 4 and 5 show alternatives of the rotating pieces belonging to the apparatuses shown in FIGS. 1, 2 and 3.

Referring to the drawings and particularly to FIGS. 1 and 2, it can be seen that the improved apparatus is made up of a tank, or container, 1, said tank being made of refractory materials and fed with molten glass 2 by using well-known means. An orifice 4 partially obturated by a needle 5 of which the position is regulated by a control device 6 is made in the sole 3 of this chamber. Below the orifice 4 there is an orifice 7 which has been made in the upper wall 8 of the centrifugation chamber 9. These two orifices are connected to one another by means of a protecting tube 10. In said centrifugation chamber, there is a rotating piece made of a hub 11 and radial arms 12. Numeral 13 (FIG. 2) shows the position of the vertical axis passing through the orifices 4 and 7. The plane containing the radial arms 12 is traversed by said axis, the point forming the intersection of said plane and axis being located inside the circumference passing through the ends of the radial arms 12. The rotating piece is borne by a spindle 14 running through a bearing 15 and cooled by a water cooling circuit which is led through conduits 16 and 17. The electric motor 18 can drive the spindle 14 by means of a belt 19. The centrifugation chamber 9 further has a burner 20 placed in its side wall and a mouth 21 for discharging the small glass beads, the axis of said mouth being tangential to the direction of the trajectories of the small glass beads. This mouth is provided with bricks 22, 23 and 24 which can be replaced so that the dimensions of the output orifice 25, through which the small glass beads are discharged, can be properly adjusted. Opposite this output orifice 25, there is a hopper 26, provided at its lower part with an orifice 27, below which a tank 28 used for collecting the small glass beads is placed.

The thread 29 of molten glass which forms at the orifice 4 is met by the rotating piece 12 and thus splits up in elements which are dragged along the arms and subjected on the latter to the centrifugal force. When they come into the vicinity of point 30, i.e., at the end of the arms, said elements are expelled into the atmosphere of chamber 9, which atmosphere is brought to and/or kept at a high temperature by means of a burner 20. The elements 31, split up again as a consequence of such an expulsion, are shaped into spheres under the action of the superficial tension, before reaching the orifice 25, through which the small glass beads are discharged. The small glass beads, formed in this manner, cool in the open air along their trajectories and in the hopper 26 in which they are finally collected at a temperature at which they can not be damaged any more.

In another embodiment of the apparatus according to the invention (FIG. 3), the molten glass 2 flows into a circular canal 1 in the sole 3 of which several orifices 4 distributed along a circumference and equipped each with a needle 5 are provided. The centrifugation chamber 9 is annular. The spindle 14 and the hub 11 are placed outside the chamber in the central space which is encircled by said chamber. In this space, they are protected against the heat of the chamber. The rotating piece passes through a slot 33 which is partially obturated by means of two rings 34 and 35, the level of which can be adjusted. The mouth of chamber 9, through which the small glass beads are discharged, is annular also, as well as the hopper 26 used for collecting the small glass beads after cooling them in the open air at numeral 32. This model of the invention works in a way which is similar to the one shown in FIGS. 1 and 2, but the production capacity of small glass beads is much higher. The number of the glass threads can advantageously be determined so that molten glass fragments can be expelled from along the whole circumference of the rotating piece.

Figure 5:
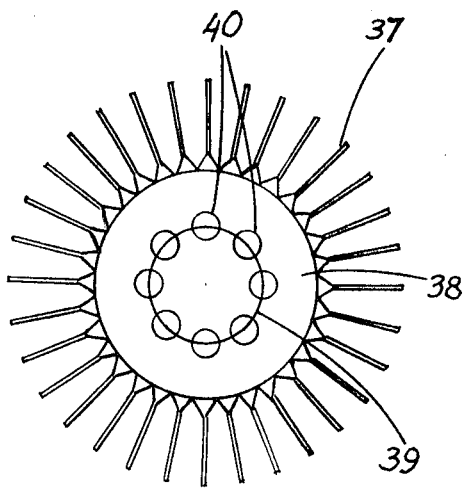

Although the rotating piece can be made of a continuous sheet, in the region of slot 33, the type used in the invention preferably shows indentations (FIG. 4) in a corona-shaped arrangement. This is the case when the arms are made of wires 12 fixed to a hub 11 the diameter of which is smaller than the rings 34 and 35, as shown in FIG. 3. One can also use a rotating piece provided with arms in the shape of blades. Shaped blades can also be used, but it is advantageous to cut them out of a circular sheet (FIGS. 4 and 5). FIG. 4 shows how the blades 36 are contained in the plane in which the rotating piece rotates. FIG. 5 shows how the blades 37 have been twisted at an angle of 90° so that the plane in which they are contained is perpendicular to the plane in which the rotating piece 38 rotates. A circumference 39, the diameter of which is the same as the diameter of the rings 34 and 35, has been drawn in FIGS. 4 and 5. FIG. 5 shows how the holes 40 made by perforating the sheet 38 are used instead of hollowings.

Figure 6:
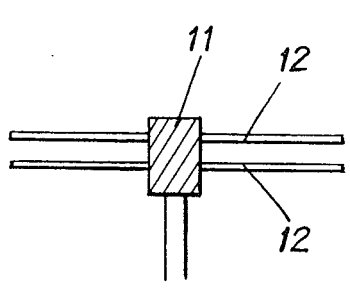
FIGS. 6 and 7 are vertical sections showing two particular models of said rotating piece.

It can also be advantageous to make a rotating piece with several sets of radial arms placed above one another with the object to increase the production of tiny glass beads. FIG. 6 shows a hub 11 provided with two sets 12 of radial wires placed above one another.

Figure 7:
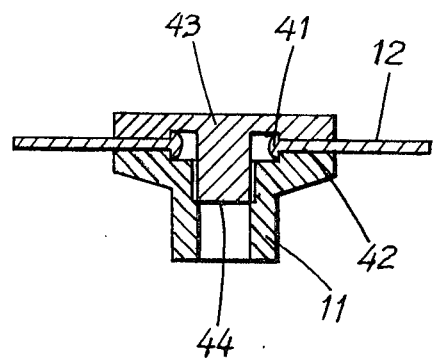

The radial arms can be fixed to the hub in any desired and suitable way. For example, the wires 12 of FIGS. 1, 2, 3 and 6 are threaded and screwed into the tapped holes provided in the hub 11. The wires can also be welded. In the rotating piece shown in FIG. 7, the wires 12 are provided with heads 41 obtained by crushing the end of said wires. These wires are placed in grooves 42 located in the hub 11 and kept in position by the plane peripheral part of the piece 43, the cylindrical part 44 of which is screwed into the hub 11.

It has been found that the effectiveness of the treatment process according to the present invention can be increased if gases are prevented from flowing from the region surrounding the chamber 9 to the interior thereof. If such flow of gas is eliminated, or at least substantially reduced, the desired temperature can be more easily maintained within the chamber, and contamination of any special treatment gases which it might be desired to employ can be prevented.

Such an inflow of undesired gas to the chamber 9 can be prevented, according to the present invention, by disposing a conduit 51 having a plurality of gas jet openings around the output orifice 25 of chamber 9. The conduit 51 is arranged to provide a screen of gas streams which flow in the directions illustrated by the arrows in FIG. 1 and which serve to prevent the passage of gases from the region surrounding chamber 9 into the output orifice 25 thereof. The gas streams making up this protective screen act more or less symmetrically on the particles emerging from chamber 9 and hence will have substantially no influence on their trajectories.

Another embodiment of the air-screen-producing arrangement is shown in FIG. 3 to include two annular conduits 52 each disposed to a respective side of the annular mouth of the chamber shown therein. Each conduit produces a plurality of air streams whose directions are indicated by the arrows, and the air streams produced by the two conduits cooperate to form a protective screen which acts symmetrically on the trajectories of the spherical particles emerging from the chamber.

It will be understood that this invention is susceptible to modification in order to adapt it to different usages and conditions and, accordingly, it is desired to comprehend such modifications within this invention as may fall within the scope of the appended clams.

What is claimed is:

1. An apparatus for manufacturing grains of a material of the type which is solid at definite temperatures and which is molten at more elevated temperatures, comprising, in combination: feeding means for dispensing at least one thread of such material in its molten state; rotatable means including a plurality of projecting arms arranged for rotation about an axis and positioned for meeting the thread of molten material from said feeding means; a laterally open chamber enclosing at least the entire portion of said rotatable means with which the molten material comes in contact and a finite region surrounding the tips of said arms; driving means operatively connected to said rotatable means for rotating said arms so as to impart high tip speed thereto for causing the molten material to be broken up into segments when the arms traverse the thread, to spread out on and wet said arms and to be expelled in the form of small particles from the tips of said arms by centrifugal force; and means associated with said chamber for maintaining the interior of said chamber at a temperature which is above the melting point of the material of the particles, said chamber being provided with at least one opening through which the expelled particles pass into a region at a temperature at which the particles solidify.

2. An arrangement as defined in claim 1 wherein said material is of the type whose viscosity at temperatures just above the melting point of said material is above about 350 poises and wherein said means associated with said chamber constitute means for maintaining at least in that zone of said chamber where the particles are expelled, temperatures substantially above said melting point at which the material has a sufficiently low viscosity to avoid the formation of fibers.

3. An arrangement as defined in claim 1 wherein said material is of the type whose viscosity at temperatures just above the melting point of the material is above about 100 poises, and wherein said means associated with said chamber constitutes means for maintaining at least in that zone where the particles are expelled, temperatures substantially above said melting point at which the material has a sufficiently low viscosity to give the particles a spherical shape.

4. An arrangement as defined in claim 1 wherein said chamber is made of refractory relatively insulating material.

5. An arrangement as defined in claim 1 wherein said chamber is provided with adjustable parts in its lateral opening for permitting the width of the opening to be modified.

6. An arrangement as defined in claim 1 wherein said feeding means is a container for holding a mass of said material and comprises an orifice which includes a needle valves and a control device associated with said valve for regulating its position so as to control the rate of flow of molten material from said container.

7. An arrangement as defined in claim 1 wherein said chamber is provided with an upper opening cooperating with said feeding means for permitting the molten material thread to flow into said chamber, said arrangement further comprising a protecting tube provided between said feeding means and said upper opening in said chamber.

8. An arrangement as defined in claim 1 wherein said arms are made of heat-resisting metal wires.

9. An arrangement as defined in claim 1 wherein said arms are in the form of blades.

10. An arrangement as defined in claim 1 wherein said arms are arranged in in a plurality of axially spaced grooves.

11. An arrangement as defined in claim 1 further comprising hopper means disposed around said chamber and spaced therefrom for collecting the resulting grains after they have solidified.

12. An arrangement as defined in claim 1 wherein said rotatable means further comprise a hub from which said arms extend and a spindle rotatably carrying said hub, said arrangement further comprising cooling means associated with said rotatable means for cooling said spindle.

13. An arrangement as defined in claim 1 wherein said chamber is laterally open around its entire circumference near the plate defined by the tips of said arms, said arrangement further comprising an annular hopper disposed around said chamber for collecting the grains passing through the lateral chamber opening.

14. An arrangement as defined in claim 1 wherein said chamber is laterally open around its entire circumference near the plane of the tips of said arms and wherein said rotatable means comprise a hub carrying said arms and a spindle rotatably carrying said hub, said chamber having an annular configuration and said spindle being disposed radially inwardly of said chamber so as to be outside the region enclosed thereby.

15. An arrangement as defined in claim 14 further comprising means disposed radially inwardly of said chamber and defining a circular slot surrounding the plane containing said arms, wherein the radially inward portion of said rotatable means is provided with a plurality of holes having a corona-shaped arrangement, which inner portion is disposed in said slot.

16. An arrangement as defined in claim 14 further comprising a pair of axially spaced rings disposed radially inwardly of said chamber and having their axes aligned with the axis of rotation of said rotatable means, wherein the radial inner portion of said rotatable means is provided with a plurality of holes disposed in a corona-shaped arrangement, the inner portion of said rotatable means being disposed between said rings.

17. An arrangement as defined in claim 1 further comprising conduit means disposed around the lateral opening of said chamber for producing a protective screen of ejected gas for preventing the passage of gases through the lateral chamber opening and into the region enclosed by said chamber.

18. A method for manufacturing grains of a material fusible by rise of temperature comprising the steps of: forming at least one thread of such a material in its molten state; disposing a rotatable piece having projecting arms in the path of the thread so that the thread intersects the area traversed by the arms when the piece rotates; rotating the piece for causing the arms to intersect the thread and thereby divide the thread into segments each of which spreads out upon its associated arm; dispersing the molten material on each arm from the tip of that arm by centrifugal force so that the molten material is divided into particles; maintaining a hot zone containing at least that part of the rotatable piece which is contacted by the material and a finite region through which the particles travel after dispersal, the hot zone being at a temperature sufficient to maintain such part and such region above the melting point of the material, and subjecting the particles to a lower temperature, at which they solidify, subsequent to passing through the hot zone.

19. A method as defined in claim 18 wherein said material is of the type whose viscosity at temperatures just above the melting point of said material is above about 350 poises and at least that region where the particles are expelled is maintained at temperatures substantially above said melting point at which the material has a sufficiently low viscosity to avoid the formation of fibers.

20. A method as defined in claim 19 wherein said material is of the type whose viscosity at temperatures just above the melting point of said material is above about 100 poises and at least that region where the particles are expelled is maintained at temperatures substantially above said melting point at which the material has a sufficiently low viscosity to give the particles a spherical shape.

21. A method as defined in claim 18 comprising the further steps of: subjecting the expelled particles to a lower temperature for solidifying them; and collecting the solidified grains.

References Cited

UNITED STATES PATENTS

| | | | |
|---|---|---|---|
| 1,671,683 | 5/1928 | Podszus | 264—8 |
| 2,306,449 | 12/1942 | Landgraf | 264—8 |
| 2,356,599 | 8/1944 | Landgraf | 264—8 |
| 3,294,511 | 12/1966 | Hess | 65—142 |
| 3,310,391 | 3/1967 | Law | 65—21 |
| 3,400,189 | 9/1968 | Nacke | 264—8 |

S. LEON BASHORE, Primary Examiner

R. L. LINDSAY, Jr., Assistant Examiner

U.S. Cl. XR.

18—2.6; 65—142; 264—5, 8